(12) United States Patent (10) Patent No.: US 12,631,267 B2
Kroczek et al. (45) Date of Patent: May 19, 2026

(54) VALVE SENSOR ASSEMBLY

(71) Applicant: Goodrich Corporation, Charlotte, NC (US)

(72) Inventors: Piotr Kroczek, Nieciszów (PL); Paweł Świrniak, Prochowice (PL); Krzysztof Słomiany, Jerzmanowice (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/665,752

(22) Filed: May 16, 2024

(65) Prior Publication Data

US 2024/0392890 A1 Nov. 28, 2024

(30) Foreign Application Priority Data

May 26, 2023 (EP) ..................................... 23461597

(51) Int. Cl.
F16K 37/00 (2006.01)

(52) U.S. Cl.
CPC ........ F16K 37/0041 (2013.01); F16K 37/005 (2013.01)

(58) Field of Classification Search
None
See application file for complete search history.

(56) References Cited

U.S. PATENT DOCUMENTS 3,206,160 A * 9/1965 Bennett ............... F16K 31/0682
335/229
5,560,392 A * 10/1996 Spang ..................... F16K 37/00
251/315.11

6,536,277 B1 3/2003 Chuang
7,710,283 B1 5/2010 Cantolino
10,124,335 B2 11/2018 Liang et al.
11,073,216 B2 * 7/2021 Kondo ................ F16K 11/0876
11,384,852 B2 * 7/2022 Wang .................... F16K 31/043
2001/0011391 A1 8/2001 Rozenblatt
(Continued)

FOREIGN PATENT DOCUMENTS

EP 2385280 A1 11/2011
JP 6785100 B2 10/2020

OTHER PUBLICATIONS

Abstract for JP6785100 (B2), Published: Nov. 18, 2020, 1 page.
European Search Report for Application No. 23461597.9, mailed Nov. 27, 2023, 8 pages.

*Primary Examiner* — Angelisa L. Hicks
(74) *Attorney, Agent, or Firm* — CANTOR COLBURN LLP

(57) ABSTRACT

A valve assembly includes a valve body having an inlet end and an outlet end and a fluid flow path extending from the inlet end to the outlet end. The assembly also includes: a moveable valve member located in the fluid flow path intermediate the inlet end and the outlet end, the moveable valve member being movable relative to the valve body between an open position to allow fluid flow from the inlet end to the outlet end along the fluid flow path through the open moveable valve member and a closed position to prevent fluid flow from the inlet end to the outlet end along the fluid flow path; and one or more fluid level tensometer sensors mounted to the moveable valve member and configured to deform to generate an electrical signal in response to a predetermined mass or pressure of fluid acting on the one or more sensors.

13 Claims, 4 Drawing Sheets

(56) References Cited

U.S. PATENT DOCUMENTS

| 2003/0001025 | A1 |   | 1/2003 | Quintana |
| 2009/0050214 | A1 | * | 2/2009 | Shani ........................ G01N 7/10 |
|   |   |   |   | 239/69 |
| 2022/0154845 | A1 |   | 5/2022 | Sapija et al. |
| 2023/0011112 | A1 |   | 1/2023 | Milani et al. |

* cited by examiner

VALVE SENSOR ASSEMBLY

CROSS REFERENCE TO RELATED APPLICATIONS

This application claims priority to European Patent Application No. 23461597.9 filed May 26, 2023, the entire contents of which is incorporated herein by reference.

TECHNICAL FIELD

The disclosure is related with a sensor arrangement in a valve assembly for detecting fluid in the valve so that the valve can be opened/closed responsive to the sensor output.

BACKGROUND

Fluid valves find application in a variety of systems for regulating or directing fluid flow. Typically, a valve is provided in a fluid flow path and has a movable valve member that moves between an open position which allows flow of fluid along the path through the valve and a closed position in which the valve prevents flow of fluid therethrough. The closed valve may completely stop fluid flow in the system or may cause the fluid to flow along a different fluid path. Some valves also have positions intermediate the open and closed positions to regulate fluid flow rate along the path. In the foregoing, it should be understood that fluid can encompass any liquid, gas or air.

The movable valve member may have various configurations depending on the system design and use. The movable member may move linearly between the valve positions. Alternatively, the valve may be a ball valve in which the movable member is a ball rotatable within and relative to the fluid flow path. A fluid channel is formed through the ball and the ball is rotatable between an open position in which the channel is aligned with the flow path to allow flow through the path via the channel, and a closed position where the channel is not aligned with the flow path so the ball blocks flow of the fluid. Such valve designs are well known.

In some applications, the valve is controlled manually by operation of a lever or handle to move the movable valve member between the different positions. In other applications, the valve is motorised—i.e. is provided with a motor that automatically drives the movable member in response to a control signal.

In some systems, the opening or closing of the valves is dependent on the level of water in a part of the system. In some cases, a valve may be arranged to open in response to a water level exceeding a threshold level. In other cases, a valve may be normally open and configured to close in response to the water exceeding a threshold level. One example of the use of automatic valves responsive to water levels is in a so-called grey water system. Grey water is water in a system that has been used but that can be recycled for a different purpose e.g. drinking water or water from a wash basin can be recycled for use in a toilet flushing system. Grey water systems are often used in building complexes or in aircraft. Valves are provided to direct and control the flow of grey water to the flush. Grey water systems are just one example of a system in which a valve is controlled based on a sensed fluid level or volume. The control signal for the valve may be provided by a sensor that detects the presence or level of fluid in the fluid path to open/close the valve accordingly.

Fluid sensing devices or assemblies find application in many fluid systems to detect fluid leakage or fluid exceeding or falling below a predetermined level. In response to such detection, valves or other fluid system parts can be opened or closed or regulated. For example, fluid level sensors can be used in water systems such as sanitation systems or appliances to detect rising fluid levels and/or volumes and to open a valve to release fluid or close a valve to prevent further fluid flow when the fluid level exceeds a certain level.

Typically, a fluid sensor assembly includes some sort of switch or trigger, e.g. a mechanical or electrical switch or a micro-switch, that is opened or closed when the fluid reaches a predetermined level. The switch position results in a signal being sent to control another part of the system such as a valve or a fluid supply, a power supply, an alarm or alert or other system part that is to respond to a given fluid level.

Typical level sensor assemblies are shown e.g. in U.S. Pat. Nos. 6,536,277, 7,710,283 and 10,124,335. Such systems typically include a switch external to the fluid flow part of the fluid system and a float in the fluid part of the system, the float being design to engage with or contact the switch to trip the switch when the float is at a position close to the switch. The float floating in the fluid is displaced as the level of fluid in the system changes. At the predetermined level of fluid, the float is designed to contact the external switch to trigger the switch, which then provides a signal to other system parts e.g. to control the opening or closing of a valve.

A commonly used arrangement in a water system includes a level sensor that is provided in a branch provided off the main fluid flow path. The branch may be provided by means of a wye fitting having a first branch that forms a part of the main flow path and a second branch that extends from the main flow path. A level sensor is located in the second branch. The main flow path is from the fluid source (e.g. a grey water source) to an outlet (e.g. to a flush) and a valve is provided in the main fluid flow path. The second branch of the wye fitting extends from the main fluid flow path at a location between the fluid source and the valve. When the valve is closed and fluid flows from the fluid source, the fluid collects in the main fluid path and is prevented from flowing to the outlet by the closed valve. As this part of the main fluid flow path fills with fluid, fluid will also flow into the second branch of the wye fitting and reach the level sensor therein. When the level sensor detects the presence of fluid in that branch it generates a signal to provide a control signal to open the valve. The open valve allows the fluid to flow through the valve to the outlet. The level of fluid in the main fluid flow path with then fall such that fluid no longer covers the sensor in the second branch, so that the sensor then causes a control signal to close the valve again.

While such level sensors are simple and effective, and are sufficiently small but robust for use in e.g. grey water systems, they do have some disadvantages.

Because the location of the sensor in the second branch of the wye fitting is spaced, along the main flow path, from the valve, at the time the fluid no longer covers the sensor, and so the signal is generated to close the valve, there may still be some fluid in the portion of the main fluid flow path between the second branch and the valve when the valve closes. This fluid will remain in the flow path until the next time the valve is opened. In extreme conditions, the fluid may e.g. freeze or can become contaminated, which can cause damage to the valve.

Another disadvantage of the wye-fitting arrangement is that it requires the extra wye fitting assembled into the fluid flow path, which adds to the overall weight, size and complexity of the system and which, by providing an additional extending arm to the system, can have a negative impact on the system during vibrations. Such vibrations are a common occurrence in many applications e.g. in aircraft.

Thirdly, the type of level sensor in these known assembles operate on the basis of electrical conductance—i.e. detect the presence of a conductive fluid such as water. While, in most cases, this will be adequate for many systems, the sensor will not detect the presence of other, non-conductive fluids and particles which may also be present in a fluid flow path. If the fluid flow path fills with such non-conductive material, this would not cause the valve to open to drain this material out of the fluid flow path.

There is, therefore, a need for an improved fluid sensor assembly that overcomes these problems.

SUMMARY

According to the disclosure, there is provided a combined valve and sensor assembly in which the sensor assembly that provides the control signal to operate the valve is incorporated in the movable member of the valve.

Particularly, there is provided a valve assembly comprising: a valve body having an inlet end and an outlet end and a fluid flow path extending from the inlet end to the outlet end; a moveable valve member located in the fluid flow path intermediate the inlet end and the outlet end, the moveable valve member being movable relative to the valve body between an open position to allow fluid flow from the inlet end to the outlet end along the fluid flow path through the open moveable valve member and a closed position to prevent fluid flow from the inlet end to the outlet end along the fluid flow path; and one or more fluid level tensometer sensors mounted to the moveable valve member and configured to deform to generate an electrical signal in response to a predetermined mass or pressure of fluid acting on the one or more sensors.

In one example, the valve assembly is a ball valve assembly, where the movable valve member is a ball defining a flow channel therethrough, the ball rotatable relative to the valve body to open the valve by aligning the fluid flow channel with the fluid flow path through the valve body and to close the valve by the fluid flow channel not being aligned with the flow path. The sensors are arranged at one or more locations on the ball that come into contact with fluid in the flow path when the ball is open and/or closed.

BRIEF DESCRIPTION OF THE FIGURES

Examples according to this disclosure will now be described with reference to the drawings. It should be noted that the drawings are by way of example only and variations are possible within the scope of the claims.

DETAILED DESCRIPTION

Figure 1:
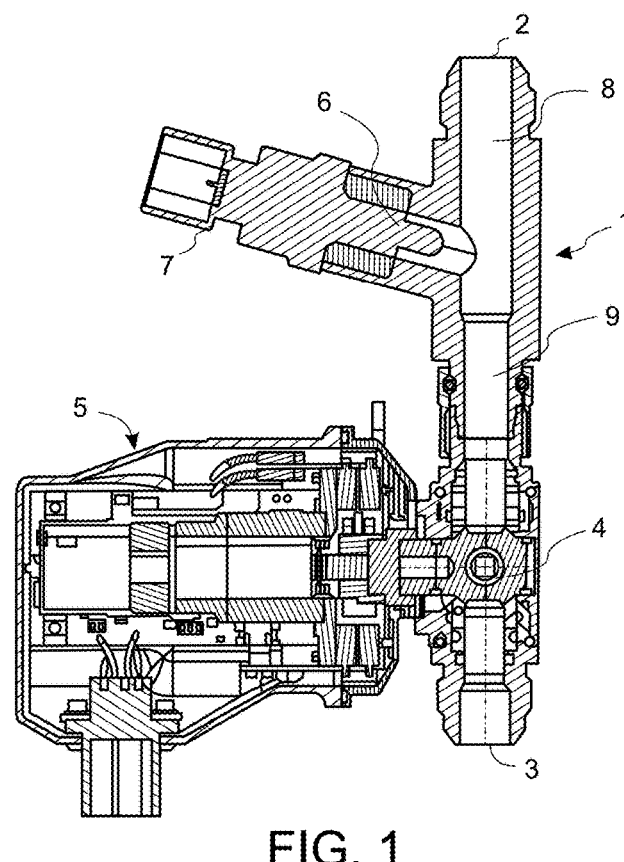
FIG. 1 is an example of a known sensor and valve assembly for the purposes of explanation.
Figure 7A:
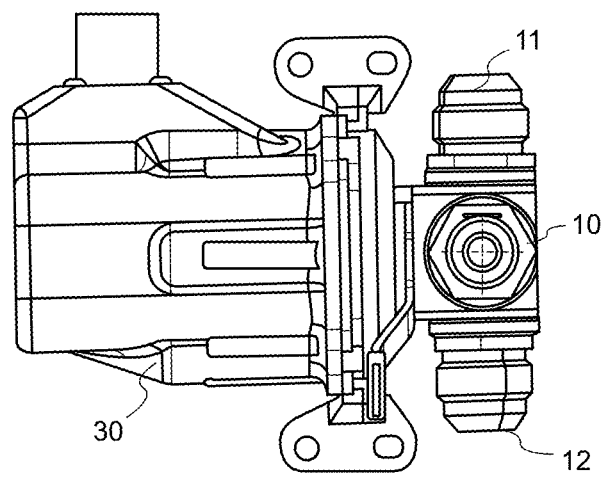
FIGS. 7A and 7B show the external shape of an assembly according to the disclosure (FIG. 7A) compared to the external shape of a known assembly (FIG. 7B) such as shown in FIG. 1.
Figure 7B:
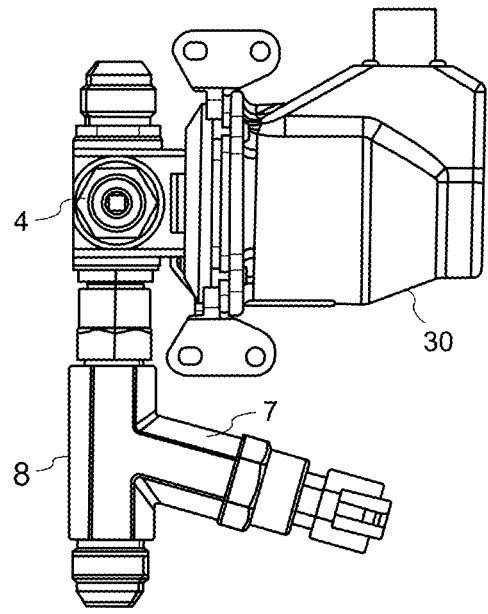

First, for background purposes, a known motorised valve assembly with fluid sensor will be described with reference to FIG. 1 (and see also FIG. 7B).

The assembly includes a main fluid flow path 1 for conveying fluid from one end 2 to be connected to a fluid source (e.g. a grey water source) (not shown) to an outlet at another end 3 (e.g. a reservoir for a toilet flush or a drain or other outlet) (not shown). A valve 4 is provided in the fluid flow path 1 between the first end and the second end to control flow of fluid from the first to the second end. The valve is controlled to move between its open and closed positions by means of a motor 5. The motor operates to move the valve in response to a signal from a fluid sensor that detects the presence or level or volume of fluid in the main fluid flow path 1, so that when a given amount of fluid is present in the fluid flow path 1, the valve 4 is opened to allow the fluid to flow to the outlet. After the fluid has passed through the valve 4, the valve is then closed again. The fluid sensor 6 is mounted in a second branch 7 of a wye-fitting, the first branch 8 of which forms part of the main fluid flow line. The second branch 7, with the fluid sensor 6 is located, extending from the main fluid flow line 1 between the first end 2 and the valve 4. When the valve 4 is closed, the fluid collects in the column of the main fluid flow path 1 between the first end 2 and the valve 4 and flows into the second branch 7 over the sensor 6. When the fluid reaches the sensor 6, the sensor generates an electric signal to control the motor 5 to open the valve 4. When the fluid does not reach the sensor, the motor closes the valve.

As mentioned above, because the location of the sensor 6 is removed from that of the valve, there is a risk that the sensor 6, when not in contact with fluid in the second branch 7, will signal the motor to close the valve but there may still be fluid 9 below the level of the sensor, between the location of the sensor and the valve, when the valve closes.

The disadvantages of such an assembly have been set out above.

To resolve these issues, the present disclosure teaches a combined valve and sensor assembly where the fluid sensor is incorporated in the valve itself-specifically in the movable part of the valve. In a ball valve, this is the ball.

The assembly of the disclosure will be described in the context of a motorised ball valve, but the concept may also be applied to other types of valve e.g. valves in which the movable part moves linearly.

The combined valve and sensor assembly will now be described by way of example only with reference to FIGS. 2 to 6.

Figure 2:
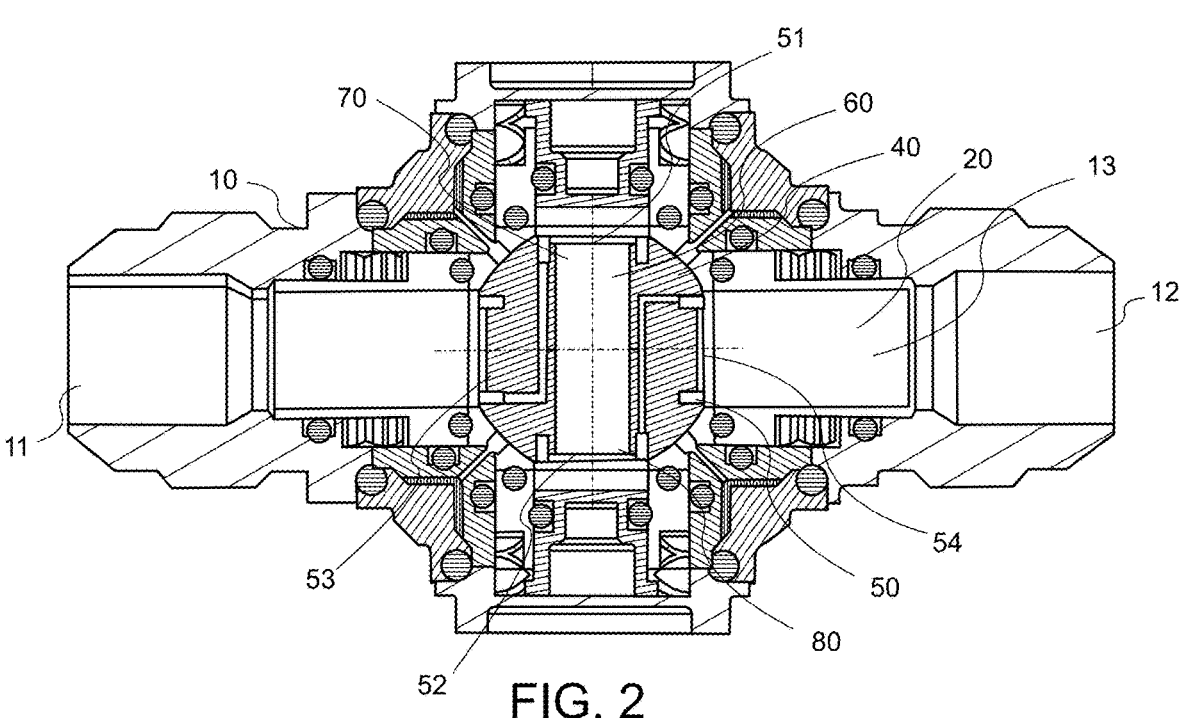
FIG. 2 is a cross-sectional view of a combined valve and sensor assembly according to the disclosure.
Figure 3:
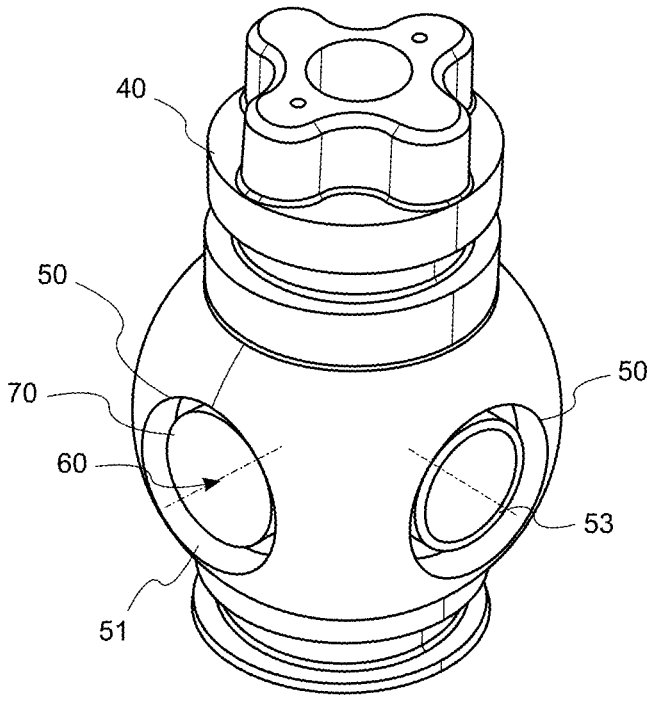
FIG. 3 is a 3D view of a valve and sensor assembly according to the disclosure.
Figure 4:
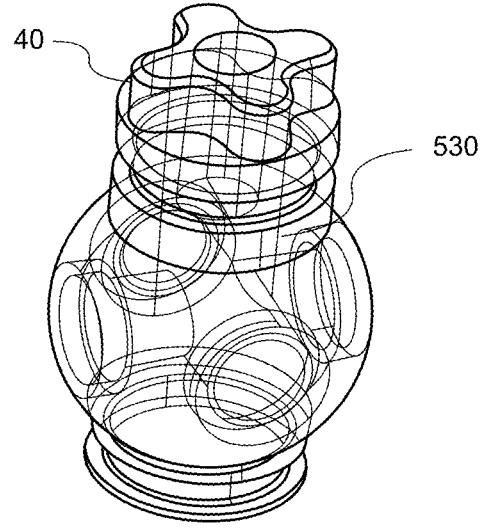
FIG. 4 is a transparent view of an assembly as shown in FIG. 3 to show the inside of the assembly.

As best seen in FIG. 2 (which shows the valve in the closed position), the assembly includes a valve body 10 having an inlet end 11 and an outlet end 12 and a fluid flow path 13 extending from the inlet end and the outlet end. In use, the valve body is assembled into a main fluid flow path of a fluid system between the first end and the second end, as described above. The assembly further includes a movable valve member 40 configured to move between an open position and a closed position relative to the valve body 10 in response to a control signal from a motor 30. The motor provides the control signal in response to the output of a fluid sensor assembly 50 (described further below) of the assembly.

In the example shown, the movable valve member 40 is a ball shaft, namely a ball-shaped member having a fluid flow channel 60 extending therethrough from a first port 70 in the ball to a second port 80, opposite the first port, formed in the ball 40. As is known in ball valves, the ports 70, 80 and channel 60 are formed such that in a first, open position of the ball 40 relative to the valve body 10, the channel is aligned with the fluid flow path 13 so that fluid can flow through the valve via the inlet end 11, through the fluid flow path 13, via the valve channel 60, to the outlet end 12. When the valve is rotated to its closed position relative to the valve body 10, the channel 60 is out of line with the fluid flow path 13 so the ball 40 blocks flow of fluid through the flow path 13.

The fluid sensor assembly 50 comprises a first sensor 51 provided at or around the first port 70 and may also comprise a second sensor 52 provided at or around the second port 80. The assembly also includes a third sensor provided on the ball at a location that is aligned with the fluid flow path 13 when the valve is in the closed position. A fourth sensor 54 may be provided at a location opposite the third sensor. The locations of the third and fourth sensors may be provided with closed or 'blind' ports to house the sensors 53, 54.

Figure 6:
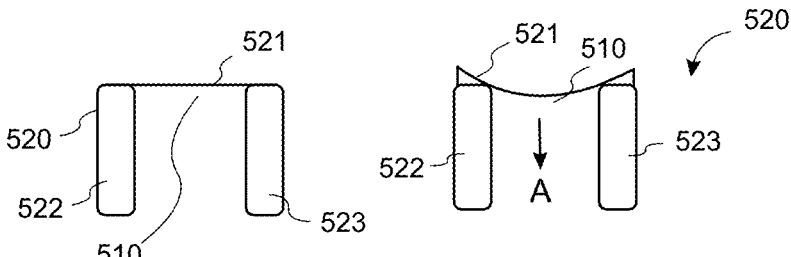
FIG. 6 shows an example of a sensor for use in an assembly according to the disclosure.

The sensor(s) 51, 52, 53, 54 are in the form of deformable members that deform under a predetermined mass or pressure of fluid acting on the sensor as will be explained further with reference to FIG. 6. Each sensor 51 comprises a deformable tensometer type sensor element 510 mounted in a sensor housing 520. The housing is configured to be mounted to the valve movable element 40 at or around the port. The port is typically circular but may have another shape. The sensor housing 520 is shaped to fit around the port in such a way that the sensor tensometer element 510 is at the interface between the fluid flow path and the port. In this example, the housing 520 is in the form of a ring having a top 521 and side legs 522, 523, and the tensometer sensor element 510 is located on the inside of the top 521, between the side legs 522, 523. When a predetermined mass or pressure of fluid acts on the top of the sensor housing it causes the top of the housing and also the sensor element 510 to deflect inwards (in the direction of arrow A in FIG. 6). This deflection creates an electric signal which is provided, via a signal conductor 530, to the motor 30.

Operation of the assembly will be further described with reference to FIGS. 5A to 5C.

Figure 5A:
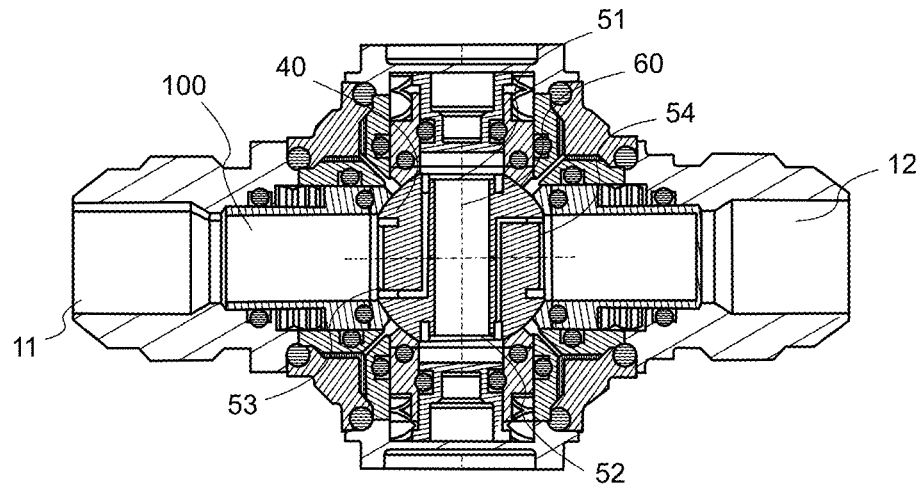
FIGS. 5A, 5B and 5C show a valve and sensor assembly according to the disclosure at different stages of valve operation.

FIG. 5A shows the assembly when the valve is in the closed position and so the valve channel 60 is not aligned with the fluid flow path 13 and so the fluid 100 which has entered the valve body via the first end 11 from the main flow path of the system cannot flow through the valve to the outlet end 12.

The third sensor 53 is, at this stage at the interface between the ball 40 and the fluid flow path in which fluid is accumulating. Once the pressure of the fluid in this part of the valve is at a sufficient level to cause the third sensor 53 to deform, this sensor 53 generates an electric signal that is communicated to the motor 30 which generates a control signal to open the valve.

Figure 5B:
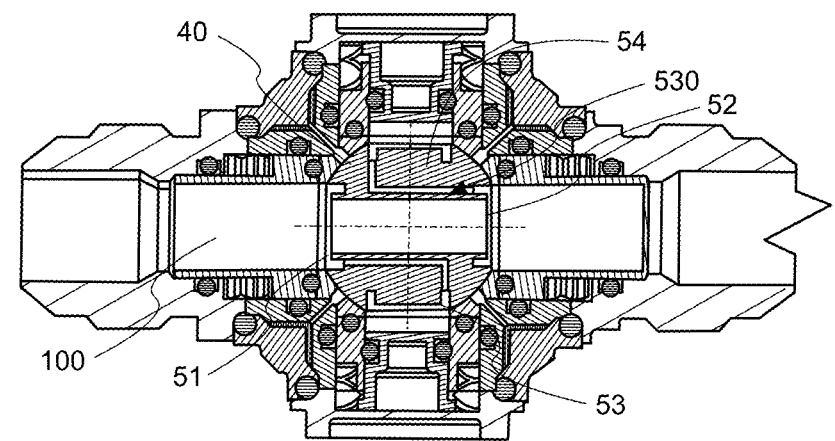

In this example, the valve opens by causing the ball 40 to rotate by 90 degrees to the position shown in FIG. 5B where the first port 70, the channel 60 and the second port 80 are aligned with the fluid flow path 13 and the fluid 100 is allowed to flow through the valve via the channel 60 to the outlet.

Figure 5C:
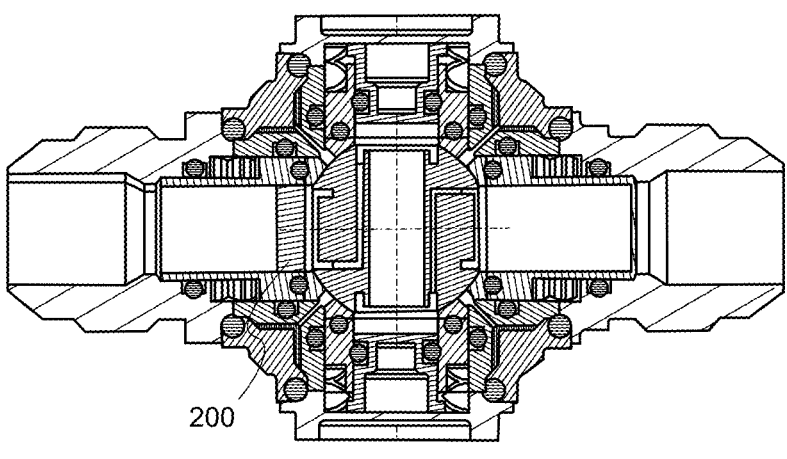

Once the pressure of the fluid 100 acting on the sensor now in contact with the fluid (i.e. now sensor 51 at the first port) reduces as the flow of fluid drops off, the sensor 51 returns to its non-deformed shape and a corresponding electrical signal is generated which is sent to the motor 30 to cause the motor to control the valve to return to its closed state (FIG. 5C).

The sensitivity of the sensor is selected to deform and generate the necessary electrical signal to cause the valve to open at a predetermined pressure of fluid depending on the design and use of the valve assembly and the fluid system. As shown in FIG. 5, some fluid 200 is still likely to remain in the fluid flow path when the valve returns to its closed position if the pressure is less than the threshold required to deform the tensometer to provide the signal to open the valve. This amount of fluid will, however, be small compared to the amount of fluid remaining in the fluid flow line in examples such as shown in FIG. 1, described above.

A particular advantage of the assembly of this disclosure is that the overall size and weight and complexity will be much less than that of the known assemblies. This can be seen by comparing FIG. 7A, which shows an assembly according to this disclosure, with an assembly such as shown in FIG. 1 and described above. Removal of the need for the wye fitting, and bringing the location of the sensor assembly closer to the valve to reduce the fluid remaining in the flow path provide significant advantages, particularly where the assembly is used in low temperature and/or high vibrational environments such as in aircraft.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is not intended that the present disclosure be limited to the particular embodiment disclosed as the best mode contemplated for carrying out this present disclosure, but that the present disclosure will include all embodiments falling within the scope of the claims.

The invention claimed is:

1. A valve assembly comprising:

a valve body having an inlet end and an outlet end and a fluid flow path extending from the inlet end to the outlet end;

a moveable valve member located in the fluid flow path intermediate the inlet end and the outlet end, the moveable valve member being movable relative to the valve body between an open position to allow fluid flow from the inlet end to the outlet end along the fluid flow path through the open moveable valve member and a closed position to prevent fluid flow from the inlet end to the outlet end along the fluid flow path; and one or more fluid level tensometer sensors mounted to the moveable valve member and configured to deform to generate an electrical signal in response to a predetermined mass or pressure of fluid acting on the one or more sensors;

wherein the movable valve member is a ball shaft formed of a ball-shaped member, rotatable relative to the valve body, and a fluid flow channel extending through the ball-shaped member from an inlet port to an outlet port;

wherein the one or more tensometer sensors includes a sensor provided at or around the inlet port;

wherein the one or more tensometer sensors each have a sensor housing shaped to fit around the inlet port;

wherein the ports are substantially circular and wherein the sensors each comprise a ring-shaped sensor housing having a top and side legs, and a deformable sensor element located on the inside of the top and between the side legs.

2. The assembly of claim 1, wherein the one or more tensometer sensors include:

a sensor mounted to the moveable valve member at a location that is in communication with the inlet end when the movable valve member is in the open position.

3. The assembly of claim 1, wherein the one or more tensometer sensors include:

a sensor mounted to the moveable valve member at a location that is in communication with the outlet end when the movable valve member is in the open position.

4. The assembly of claim 1, wherein the one or more tensometer sensors include:

a sensor mounted to the moveable valve member at a location that is in communication with the inlet end when the movable valve member is in the closed position.

5. The assembly of claim 1, wherein the one or more tensometer sensors include:

a sensor mounted to the moveable valve member at a location that is in communication with the outlet end when the movable valve member is in the closed position.

6. The assembly of claim 1, wherein the one or more tensometer sensors include:

a first sensor mounted to the moveable valve member at a location that is in communication with the inlet end when the movable valve member is in the open position;

a second sensor mounted to the moveable valve member at a location that is in communication with the outlet end when the movable valve member is in the open position;

a third sensor mounted to the moveable valve member at a location that is in communication with the inlet end when the movable valve member is in the closed position; and a fourth sensor mounted to the moveable valve member at a location that is in communication with the outlet end when the movable valve member is in the closed position.

7. The assembly of claim 1, wherein the one or more tensometer sensors comprises a deformable sensor element mounted in a sensor housing.

8. The assembly of claim 1, wherein the one or more tensometer sensors includes:

a sensor provided at or around the outlet port.

9. The assembly of claim 1, wherein the one or more tensometer sensors includes:

a sensor located on the ball-shaped member between the inlet port and the outlet port to be aligned with the inlet end when the movable valve element is in the closed position.

10. The assembly of claim 1, wherein the one or more tensometer sensors includes:

a sensor located on the ball-shaped member between the inlet port and the outlet port to be aligned with the outlet end when the movable valve element is in the closed position.

11. The assembly of claim 1, further comprising:

an electrical conductor connected to the or each of the one or more sensors to convey the electrical signal to a controller; and a motor to cause movement of the movable valve member between the open and closed positions based on the electrical signal.

12. The assembly of claim 1, being a valve assembly for a water system.

13. The assembly of claim 1, being a valve assembly for a grey water system.

* * * * *